US009513644B1

(12) United States Patent
Kwak et al.

(10) Patent No.: US 9,513,644 B1
(45) Date of Patent: Dec. 6, 2016

(54) ENERGY EFFICIENT SYSTEMS HAVING LINEAR REGULATORS AND METHODS OF OPERATING THE SAME

(71) Applicant: Maxim Integrated Products, Inc., San Jose, CA (US)

(72) Inventors: Sung Ung Kwak, Frisco, TX (US); Nancy Kow Iida, Irving, TX (US); Edward Tangkwai Ma, Plano, TX (US); Khankap Mounarath, Frisco, TX (US); Robert Michael Muchsel, Addison, TX (US); Hung Thanh Nguyen, Plano, TX (US); Gary Zanders, Fairview, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 599 days.

(21) Appl. No.: 13/742,751

(22) Filed: Jan. 16, 2013

(51) Int. Cl.
*H02J 1/00* (2006.01)
*G05F 1/10* (2006.01)

(52) U.S. Cl.
CPC .. *G05F 1/10* (2013.01); *H02J 1/00* (2013.01)

(58) Field of Classification Search
CPC ..................... H02J 1/00
USPC ..................... 307/37
See application file for complete search history.

(56) References Cited

U.S. PATENT DOCUMENTS 7,702,929 B2 * 4/2010 Sutardja ..................... 713/300
8,115,336 B1 * 2/2012 Voo ..................... H02J 1/00 307/36
2006/0097708 A1 * 5/2006 Tanner et al. ..................... 323/269
2006/0114019 A1 * 6/2006 Sutardja ..................... 326/37
2006/0119390 A1 * 6/2006 Sutardja ..................... 326/62
2006/0170401 A1 * 8/2006 Chen et al. ..................... 323/273
2007/0040601 A1 * 2/2007 Lee ..................... G05F 1/465 327/540
2007/0097569 A1 * 5/2007 Huang ..................... 361/56
2007/0252564 A1 * 11/2007 De Nisi ..................... H02M 1/10 323/268
2011/0148385 A1 * 6/2011 North ..................... G05F 3/16 323/304
2012/0081086 A1 * 4/2012 Van Dijk et al. ..................... 323/273
2013/0076326 A1 * 3/2013 Lee ..................... G05F 1/563 323/284
2013/0131771 A1 * 5/2013 Lehmann et al. ..................... 607/137

* cited by examiner

*Primary Examiner* — Adi Amrany
(74) *Attorney, Agent, or Firm* — North Weber & Baugh LLP

(57) ABSTRACT

The invention relates to systems having linear regulators and methods of operating the systems. The system includes: a linear regulator responsive to an input voltage and operative to output a regulated voltage; a first circuit responsive to the regulated voltage and configured to operate at a first voltage difference between the regulated voltage and a ground level; and a second circuit responsive to the input voltage and the regulated voltage and configured to operate at a second voltage difference between the input voltage and the regulated voltage. The second circuit is coupled to the first circuit so that an entire portion of a current flowing through the second circuit is configured to enter into the first circuit during operation, wherein the current flowing through the second circuit bypasses the linear regulator.

19 Claims, 4 Drawing Sheets

ENERGY EFFICIENT SYSTEMS HAVING LINEAR REGULATORS AND METHODS OF OPERATING THE SAME

BACKGROUND

A. Technical Field

The present invention relates to energy efficient systems having linear regulators, and more particularly, to low power systems having integrated regulators.

B. Background of the Invention

A linear regulator is a system widely used to generate a steady voltage output. A typical regulating device is made to act like a variable resistor, continuously adjusting output impedance to maintain a constant output voltage.

Linear regulators are often inefficient in terms of power usage and waste a significant portion of the electrical energy by dissipating it as heat. FIG. 1 shows a conventional circuit 100 having a linear regulator 102. The rate at which electrical energy is dissipated by linear regulator 102 as heat is i1*(Vin−Vout), where Vin is the input voltage applied to linear regulator 102 and Vout is the output voltage of the linear regulator and is used to provide electrical power to circuit 104. The current i1 106 is the sum of current i2 107 and current i3 108.

The efficiency in power usage is an important factor considered in designing a circuit having a limited power supply, such as a battery. Even though linear regulators are inefficient compared to other types of regulators, such as switching regulator, linear regulators are still used in various circuits due to the low noise, short response time, low manufacturing cost, low area, and less strict requirements on input voltage. In such cases, circuit designers have to sacrifice the power efficiency in exchange for the advantages of linear regulators. As such, there is a need for a system that uses linear regulator without compromising efficiency in power usage.

SUMMARY OF THE INVENTION

Various embodiments of the present invention relate to systems having linear regulators and methods for operating the systems. Each system has partitioned circuit groups and the current flowing through at least one of the circuit groups bypasses the linear regulator to thereby enhance the efficiency in power utilization of the system.

One aspect of the invention is a system having an enhanced power utilization mechanism. The system includes: a linear regulator responsive to an input voltage and operative to output a regulated voltage; a first circuit responsive to the regulated voltage and configured to operate at a first voltage difference between the regulated voltage and a ground level; and a second circuit responsive to the input voltage and the regulated voltage and configured to operate at a second voltage difference between the input voltage and the regulated voltage, the second circuit being coupled to the first circuit so that an entire portion of a current flowing through the second circuit is configured to enter into the first circuit during operation, wherein the current flowing through the second circuit bypasses the linear regulator.

Another aspect of the invention is a system having an enhanced power utilization mechanism. The system includes: a linear regulator responsive to an input voltage and operative to output at least one regulated voltage; and one or more sub-circuits. Each of the sub-circuits includes: a first circuit responsive to the at least one regulated voltage and configured to operate at a first voltage difference between the regulated voltage and a ground level; a second circuit responsive to the at least one regulated voltage; and a monitor responsive to a second voltage difference between the input voltage and the at least one regulated voltage and a monitor reference voltage and operative to apply one of the first and second voltage differences to the second circuit.

Another aspect of the invention is a method of operating a system having an enhanced power utilization mechanism. The method includes: applying an input voltage to a linear regulator to cause the linear regulator to generate a regulated voltage; applying the regulated voltage to a first circuit so that the first circuit operates at a first voltage difference between the regulated voltage and a ground; monitoring a second voltage difference between the input voltage and the regulated voltage; determining if the second voltage difference is larger than a reference voltage; and if an answer to the determination is affirmative, applying the second voltage difference to the second circuit; and otherwise, applying the first voltage difference to the second circuit.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

A reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Figure 1:
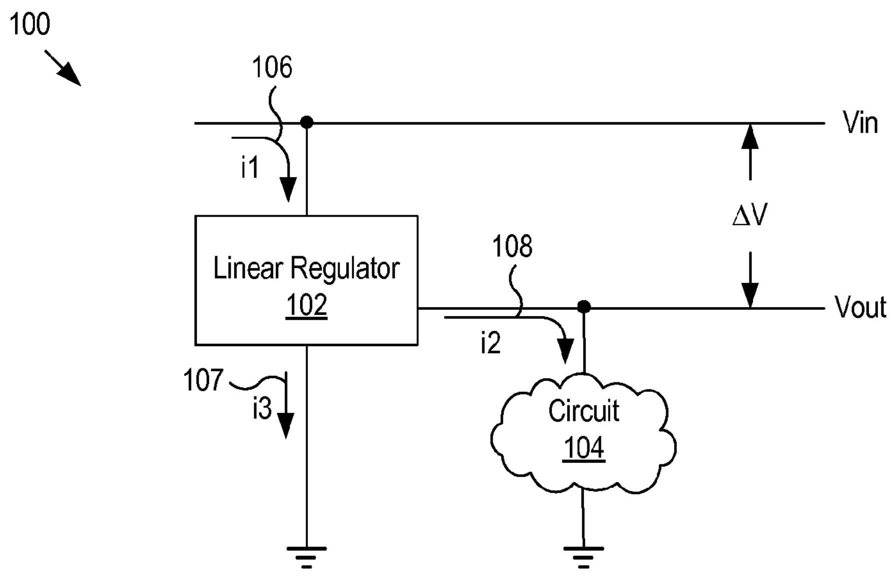
FIG. 1 (PRIOR ART)
FIG. 1 illustrates a conventional circuit having a linear regulator.
Figure 2:
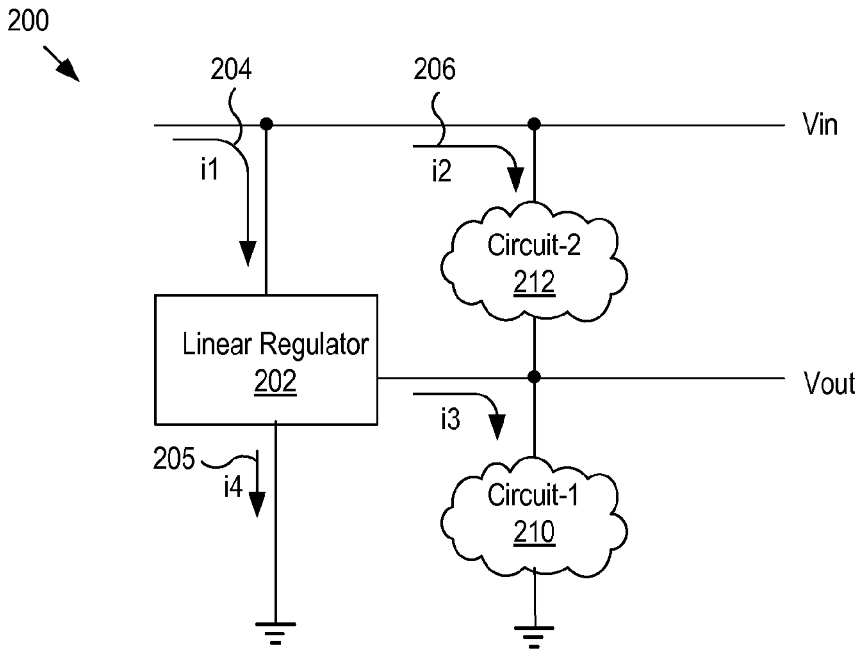
FIG. 2 illustrates an exemplary system having a linear regulator according to one embodiment of the present invention.

FIG. 2 illustrates an exemplary system 200 having a linear regulator according to one embodiment of the present invention. As depicted, system 200 includes: a linear regulator 202; circuit-1 210; and circuit-2 212. System 200 may be any suitable device or electrical component, such as system-on-chip, and have digital and analog subsystems. For instance, linear regulator 202 may be integrated into a system-on-chip (SoC) to form a low power SoC with an integrated regulator. For the purpose of brevity, current i4 205, which is associated with the power consumed by linear regulator 202, will not be discussed hereinafter. Also, hereinafter, the terms component, circuit, device, and system are used interchangeably.

Linear regulator 202 receives electrical power at an input voltage, Vin, and outputs electrical power at an output voltage, Vout. Hereinafter, Vout is referred to as regulated voltage. The level of Vin may change during operation of system 200, while the level of Vout is maintained at a constant value by linear regulator 202. For instance, system 200 may be powered by a battery and Vin may decrease as the battery discharges.

Circuit-1 210 and circuit-2 212 are partitioned to form a stacked set of circuitry. Hereinafter, the term stacked refers to an arrangement where the low voltage terminal of a circuit, i.e., circuit-2 212, is coupled to a high voltage terminal of another circuit, i.e., circuit-1 210. The designer of system 200 may partition circuits into the two groups, i.e., circuit-1 and circuit-2, considering several factors. For instance, in general, analog circuits have well defined static power consumption rates. Thus, in embodiments, circuit-1 210 may include analog circuits that consume more power than digital circuits while circuit-2 212 may include digital circuits. In another example, in embodiments, circuit-1 210 may include a system clock that operates at 10 MHz, while circuit-2 212 may include an oscillator that operates at 5 MHz. In yet another example, in embodiments, circuit-1 210 includes circuits/components that require a constant input voltage while circuit-2 212 includes circuits/components that are less sensitive to the variation of input voltage. It should be apparent to those of ordinary skill in the art that other suitable factors may be used to partition the circuits. Also, circuits may be dynamically partitioned, i.e., some components/circuits may be grouped, depending on operational conditions. For instance, a circuit may be grouped into circuit-2 212 when Vin is high, and grouped into circuit-1 210 when Vin is low. In still another example, circuits may be partitioned based on the response speed to a voltage variation. For instance, the response of circuit-2 212 to a voltage variation is slower than the response of circuit-1 210 to the same voltage variation.

Unlike a conventional system, system 200 causes current i2 206 to bypass linear regulator 202. As such, electrical power at a voltage difference ΔV (=Vin−Vout) and current i2 206 is provided to circuit-2 212, where this power would have over time been dissipated as heat in a conventional system. As such, system 200 has enhanced energy efficiency compared to the conventional system.

There are few conditions that need to be satisfied in order for system 200 to work. First, current i1 204 must be greater than zero. Otherwise, linear regulator 202 would cease to function. Second, the voltage difference ΔV is suitable for circuit-2 212 that is stacked over circuit-1 210. Third, any data connections between circuit-1 210 and circuit-2 212 must be level translated. By partitioning the circuits into two groups, system 200 has two voltage domains and two power domains. Thus, a suitable voltage level shifter (not shown in FIG. 2) should level translate the data connection between circuit-1 210 and circuit-2 212.

Figure 3:
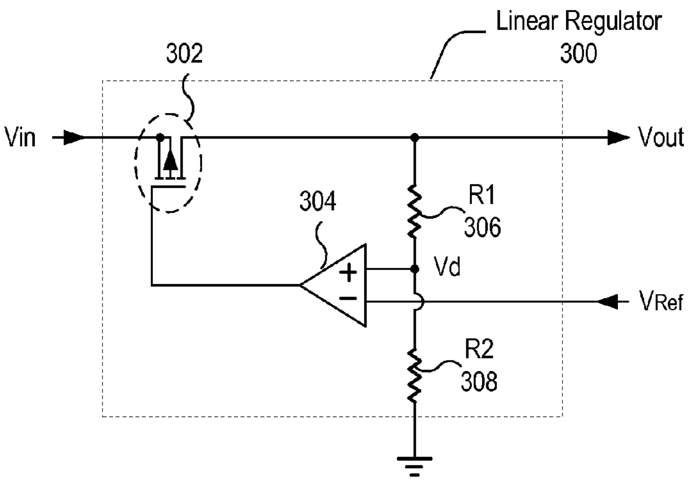
FIG. 3 illustrates an exemplary linear regulator that might be used in the system of FIG. 2.

FIG. 3 illustrates an exemplary linear regulator 300 that might be used in system 200 of FIG. 2. Linear regulator 300 includes: a regulator 302, which is preferably, but not limited to, a PMOS transistor; resistors R1 306 and R2 308; and an op-amp 304. The negative feedback loop formed by resistor R1 306, op-amp 304, and the PMOS transistor 302 insures that the divided voltage Vd stays close to the reference voltage Vref, where Vout=Vref*(1+R1/R2). In embodiments, Vref may be provided by a voltage source outside linear regulator 300, such as a bandgap. Alternatively, in embodiments, the voltage source for Vref may be included in linear regulator 300. It is noted that FIG. 3 shows an exemplary implementation of a linear regulator. As such, it should be apparent to those of ordinary skill in the art that other suitable types of linear regulator may be used in place of linear regulator 300. It is also noted that linear regulator 300, and other suitable types of linear regulator, may be used in the systems shown in FIGS. 3-5 and 7.

Figure 4:
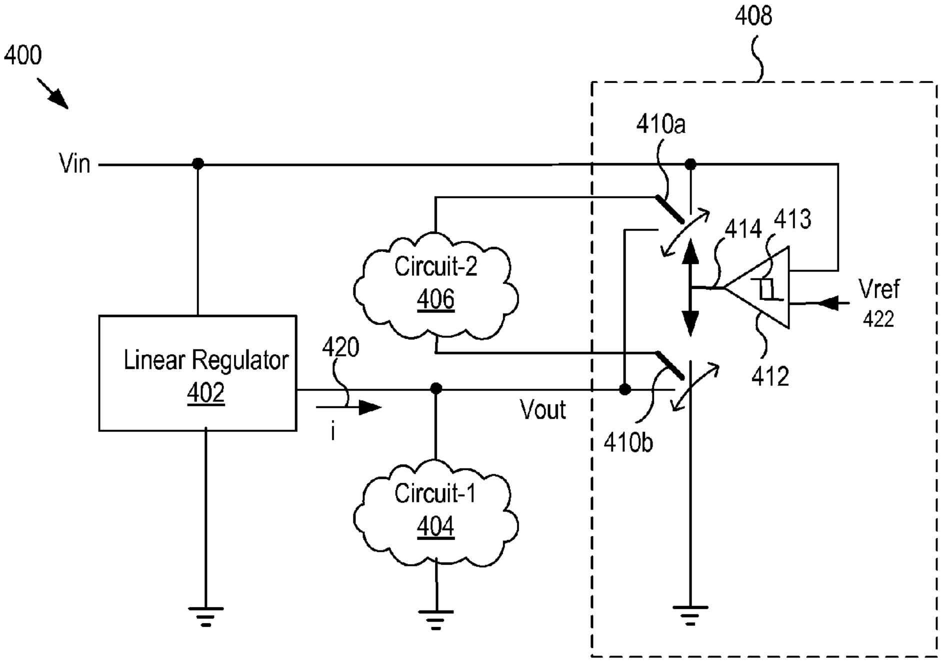
FIG. 4 illustrates an exemplary system having a linear regulator according to another embodiment of the present invention.

FIG. 4 illustrates an exemplary system 400 having a linear regulator according to one embodiment of the present invention. As depicted, system 400 includes: a monitoring circuit (or, shortly, monitor) 408 having a comparator 412 and a pair of switches 410*a* and 410*b*; circuit-1 404; circuit-2 406; and a linear regulator 402. System 400 is similar to system 200, with the difference that the monitor 408 monitors the input voltage Vin and controls the input voltage to circuit-2 406.

Comparator 412 compares Vin to a monitor reference voltage Vref (or, shortly, reference voltage) 422 and sends a control signal 414 to the pair of switches 410*a* and 410*b*. In embodiments, the monitor reference voltage, Vref, may be provided by a component located outside the monitor 408. Alternatively, in embodiments, monitor 408 may include a component for providing Vref. When Vin is higher than Vref, switch 410*a* is flipped upward and switch 410*b* is flipped downward so that the voltage difference ΔV (=Vin−Vout) is applied to circuit-2 406. In this operation mode (which is referred to as efficient mode), system 400 has the similar arrangement as system 200. When Vin is lower than Vref, the pair of switches 410*a* and 410*b* are reversed so that circuit-2 406 is powered by Vout to ground. In this mode (which is referred to as normal mode), current i 420 is split and the split currents flow into circuit-1 404 and circuit 2

406 while the same voltage is applied to both circuits, i.e., circuit-1 404 and circuit-2 406 are arranged in parallel. When Vin is close to Vref, a small fluctuation in Vin may cause artificial toggling of switches 410*a* and 410*b*. To avoid the false switching, comparator 412 may have hysteresis 413 as indicated in FIG. 4.

It is noted that linear regulator 402 includes input and output terminals (not indicated in FIG. 4), through which linear regulator 402 receives and sends the input and output voltages, respectively. Circuit-1 404 has a first terminal coupled to the output terminal of linear regulator 402 and a second terminal coupled to the ground. Circuit-2 406 has two terminals coupled to the pair of switches 401*a* and 410*b*, respectively. Switch 401*a* couples the first terminal of circuit-2 406 to either the input terminal of linear regulator 402 or output terminal of linear regulator 402. Switch 410*b* couples the second terminal of circuit-2 406 to either the output terminal of linear regulator 402 or the ground.

When the pair of switches 410*a* and 410*b* are toggled to change the operation mode, the voltage applied to circuit-2 406 changes from ΔV to Vout, or vice versa. When system 400 changes from the efficient mode to the normal mode, circuit-2 406 experiences a large voltage change if switch 410*b* is toggled to the ground first. If switch 410*b* is toggled to the ground first while switch 410*a* is still coupled to Vin, the voltage difference of Vin is applied to circuit-2 406. When switch 410*a* is subsequently toggled to Vout, a voltage difference of Vout is applied to circuit-2 406. Thus, during the switching process, the voltage applied to circuit-2 406 varies in the sequence of ΔV→Vin→Vout, causing an overstress to circuit-2 406. As such, in embodiments, switch 410*a* is toggled to Vout first while switch 410*b* is still coupled to Vout. Then, switch 410*b* is toggled to the ground. In this switching process, the voltage applied to circuit-2 406 varies in the sequence of ΔV→0 V→Vout, reducing overstress to circuit-2 406. When system 400 changes from the normal mode to the efficient mode, switches 410*a* and 410*b* are toggled in the reverse order, i.e., switch 410*b* is toggled to Vout first, then switch 410*a* is toggled to Vin subsequently. System 400 will switch modes in a controlled manner in order to avoid loss of information. In embodiments, system 400 may for example store circuit state in a memory and restore state after switching.

Figure 5:
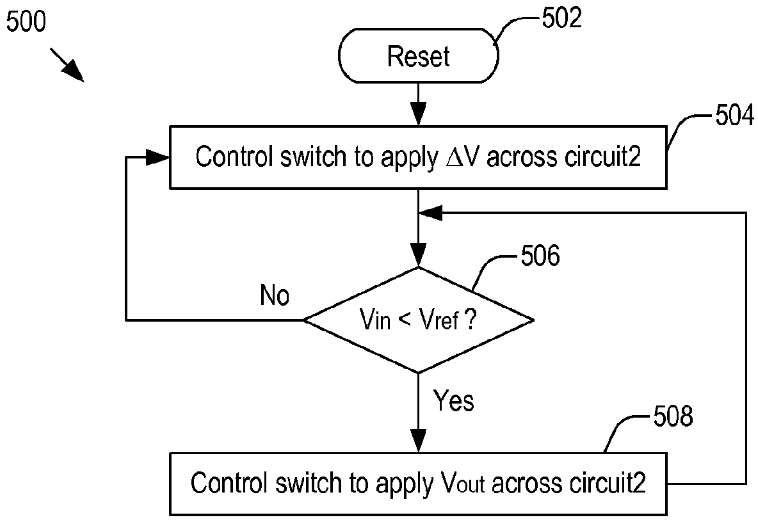
FIG. 5 is a flowchart of an exemplary process for operating the system in FIG. 4 according to another embodiment of the present invention.
Figure 6:
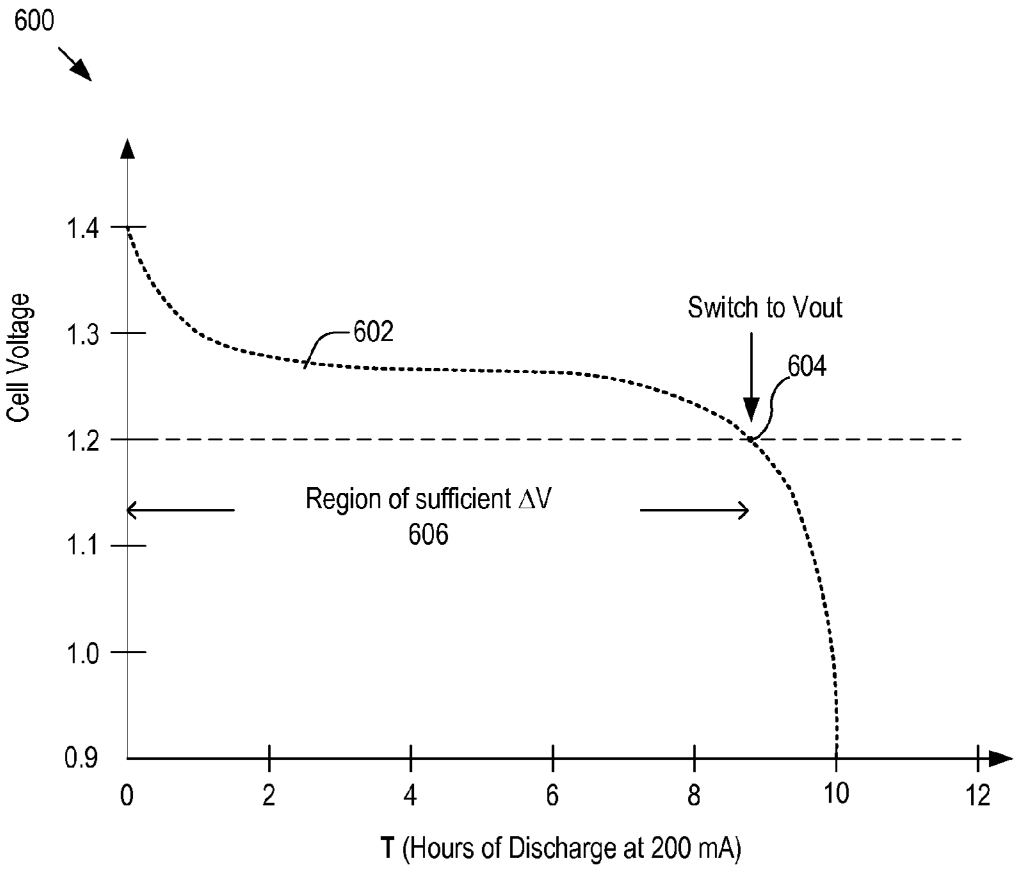
FIG. 6 is an exemplary plot of cell voltage as a function of discharge time according to another embodiment of the present invention.

FIG. 5 is a flowchart 500 of an exemplary process for operating system 400 in FIG. 4 according to another embodiment of the present invention. FIG. 6 is an exemplary graph 600 of cell voltage 602 (y-axis) as a function of discharge time T (x-axis) according to another embodiment of the present invention. For the purpose of illustration, it is assumed that two batteries are connected in series to provide 2.8 V at T=0, as depicted in FIG. 6. Also, Vref 422 and Vout are set to 2.4V and 1.5 V, respectively.

System 400 is reset at step 502. Then, as the batteries start providing electrical power to system 400, monitor 408 toggles the pair of switches 410*a* and 410*b* to enter the efficient mode, i.e., the voltage difference ΔV (=Vin−Vout) is applied to circuit-2 406 and the regulated voltage Vout to ground is applied to circuit-1 404 at step 504. In the present example, when the discharge time T is zero, 1.3 V (=2.8 V-1.5 V) is applied to circuit-2 406 while Vout (=1.5 V) is applied to circuit-1 404. Then, as shown in FIG. 6, the drop in cell voltage 602 (i.e., Vin) is fairly small until it accelerates after 80% to 90% of the total runtime. As such, in the region of sufficient ΔV 606, system 400 is operated in the efficient mode to thereby enhance the efficiency in power consumption. Monitor 408 continuously checks if Vin drops below Vref at step 506. When system 400 is in the region of sufficient ΔV 606, the answer to decision 506 is negative, and the process 500 proceeds to 504.

When the discharge time T approaches point 604, Vin drops below Vref and the answer to decision 506 becomes affirmative. Then, the process proceeds to step 508. At step 508, the pair of switches 410*a* and 410*b* are toggled so that both circuit-1 404 and circuit-2 406 are powered at the same voltage Vout to ground, i.e., system 400 enters the normal mode. Depending on the requirements of circuits-1 404 and circuit-2 406, Vout could be subsequently lowered to a suitable level, such as 1.2 V, for instance, which prolongs the region of sufficient ΔV 606 until system 400 enters the normal mode.

Figure 7:
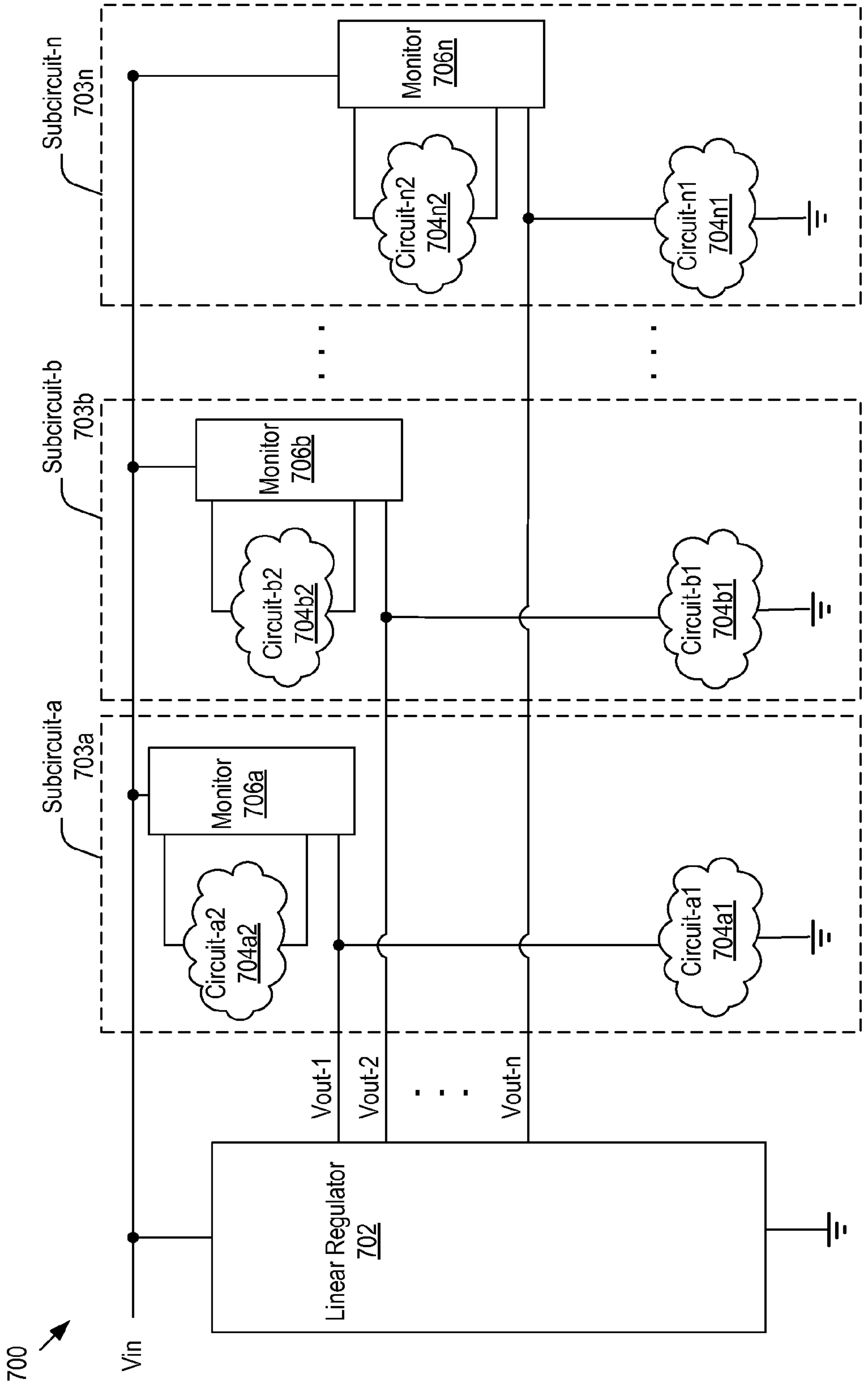
FIG. 7 illustrates an exemplary system having a linear regulator according to another embodiment of the present invention.

FIG. 7 illustrates an exemplary system 700 having a linear regulator according to one embodiment of the present invention. As depicted, system 700 includes multiple sub-circuits 703*a*-703*n*, where each sub-circuit has a preset regulated voltage Vout. The electrical powers supplied to circuit-a1 704*a*1 and circuit-a2 704*a*2 are controlled by monitor 706*a*. Likewise, the electrical powers supplied to circuit-b1 704*b*1 and circuit-b2 704*b*2 are controlled by monitor 706*b*, while the electrical powers supplied to circuit-n1 704*n*1 and circuit-n2 704*n*2 are controlled by monitor 706*n*. The number n can be any suitable integer number, i.e., the designer of system 700 may partition circuits/components into suitable number of groups.

Linear regulator 702 may output a plurality of regulated voltages, Vout-1-Vout-n. To generate multiple Vout signals, in embodiments, linear regulator 702 may include multiple sub linear regulators, each of which is similar to linear regulator 300 in FIG. 3.

Each regulated voltage Vout is used to control the electrical power supplied to the corresponding sub-circuit. For instance, Vout-1 is used by monitor 706*a* to control the electrical power supplied to circuit-a1 704*a*1 and circuit-a2 704*a*2. The structure of each monitor is similar to that of monitor 408 in FIG. 4. As such, the description of monitors 706*a*-706*n* is not repeated for brevity. Also, each monitor may operate according to the steps in flowchart 500. As such, the description of how the monitors 706*a*-706*n* are operated is not repeated for brevity.

Each monitor may have a unique Vref so that the corresponding sub-circuit exits the efficient mode and enters the normal mode when ΔV reaches the unique Vref. Using predetermined Vout and Vref, each monitor may control the power usage of the corresponding sub-circuit in order to optimize the overall power utilization of system 700.

As discussed above, systems 200, 400, and 700 may be any suitable type of electrical components, devices, or circuits. For instance, systems 200, 400, and 700 are system-on-chips having the integrated linear regulators, even though they are not limited to SoC. Also, it should be apparent to those of ordinary skill in the art that systems 200, 400, and 700 may have variations without deviating from the scope of the present invention. For instance, system 700 may have multiple linear regulators so that each linear regulator generates one or more regulated voltages.

As discussed above, the pair of switches 410*a* and 410*b* should be toggled in a proper sequence to reduce overstress to circuit-2 406 when system 400 changes from the efficient mode to the normal mode, or vice versa. In embodiments, the same switching sequence is applied to each sub-circuit in system 700.

It is noted that, for each pair of stacked circuits in systems 200, 400, and 700, circuit-1 is coupled to the ground while circuit-2 is coupled to Vout in the efficient mode, and thus, circuit-2 has higher reverse bias in the efficient mode. Since higher reverse bias means lower leakage current, systems 200, 400, and 700 will have lower current leakage during the efficient mode, which is another advantage of the embodiments of the presently claimed invention.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A system having an enhanced power consumption mechanism, comprising:

a regulator responsive to an input voltage and operative to output a regulated voltage;

a first circuit coupled to the regulator and configured to operate at a first voltage difference between the regulated voltage and a ground level;

a second circuit; and a monitor that compares the input voltage to a reference voltage, causes the regulator to apply the first voltage difference across the first circuit and the second circuit if the input voltage is lower than the reference voltage and causes the regulator to apply the first voltage difference across the first circuit and applies a second voltage difference across the second circuit to operate the second circuit at the second voltage difference across the second circuit if the input voltage is higher than or equal to the reference voltage, the second voltage difference being a difference between the input voltage and the regulated voltage.

2. The system according to claim 1, wherein the monitor includes:

a comparator that compares the input voltage to the reference voltage and outputs a switching signal; and a pair of switches that receives the switching signal and couples the second circuit to different voltage differences according to the switching signal.

3. The system according to claim 1, wherein the system is a silicon-on-chip.

4. The system according to claim 1, wherein the input voltage is provided by a battery.

5. A system having an enhanced power consumption mechanism, comprising:

a regulator responsive to an input voltage and operative to output at least one regulated voltage; and one or more sub-circuits coupled to the regulator, each of the sub-circuits including:

a first circuit that operates at a first voltage difference between the at least one regulated voltage and a ground level;

a second circuit; and a monitor that compares the input voltage to a reference voltage, causes the regulator to apply the first voltage difference across the first circuit and the second circuit if the input voltage is lower than the reference voltage and causes the regulator to apply the first voltage difference across the first circuit and applies a second voltage difference across the second circuit to operate the second circuit at the second voltage difference across the second circuit if the input voltage is higher than or equal to the reference voltage, the second voltage difference being a difference between the input voltage and the at least one regulated voltage.

6. The system according to claim 5, wherein the first and second circuits are arranged in series when the second voltage difference is applied across the second circuit.

7. The system according to claim 5, wherein the first and second circuits are arranged in parallel when the first voltage difference is applied across the second circuit.

8. The system according to claim 5, wherein the regulator includes:

at least one regulator component responsive to a control signal and the input voltage and operative to generate the at least one regulated voltage; and at least one comparator responsive to a comparator input voltage and a regulator reference voltage and operative to compare the comparator input voltage to the regulator reference voltage and generate the control signal, the comparator input voltage being generated by multiplying a factor to the at least one regulated voltage.

9. The system according to claim 8, wherein the at least one regulator component is a PMOS transistor.

10. The system according to claim 5, wherein the monitor includes:

a comparator that compares the input voltage to the reference voltage and outputs a switching signal; and a pair of switches that receives the switching signal and couples the second circuit to different voltage differences according to the switching signal.

11. The system according to claim 10, wherein the comparator has a hysteresis to prevent the comparator from generating a false switching signal.

12. The system according to claim 5, wherein the system is a silicon-on-chip.

13. The system according to claim 5, wherein the input voltage is provided by a battery.

14. The system according to claim 5, wherein a response of the second circuit to a voltage variation is slower than a response of the first circuit to the voltage variation.

15. A method of operating a system having an enhanced power consumption mechanism, comprising:

applying an input voltage to a regulator to cause the regulator to generate a regulated voltage;

applying the regulated voltage to a first circuit, causing the first circuit to operate at a first voltage difference between the regulated voltage and a ground;

comparing the input voltage to a reference voltage;

if the input voltage is higher than or equal to the reference voltage, applying a second voltage difference across the second circuit to operate the second circuit at the second voltage difference across the second circuit, the second voltage difference being a difference between the input voltage and the regulated voltage; and if the input voltage is lower than the reference voltage, causing the regulator to apply the first voltage difference across the first circuit and the second circuit.

16. The method of claim 15, wherein the step of applying an input voltage to a regulator includes:

multiplying a factor to the regulated voltage to obtain a regulator input voltage;

comparing the regulator input voltage to a regulator reference voltage; and based on the comparison, controlling a regulator component inside the regulator to thereby cause the regulator component to generate the regulated voltage.

17. The method according to claim 15, where the step of comparing the input voltage to a reference voltage includes:

inputting the input voltage and the reference voltage to a comparator; and causing the comparator to compare input voltage to the reference voltage.

18. The method according to claim 17, further comprising:

causing the comparator to have a hysteresis to thereby avoid a false answer in the step of comparing the input voltage to a reference voltage.

19. The method according to claim 15, wherein a response of the second circuit to a voltage variation is slower than a response of the first circuit to the voltage variation.

* * * * *